(12) United States Patent (10) Patent No.: US 12,640,387 B2
Kakuta et al. (45) Date of Patent: May 26, 2026

(54) FUEL CELL SYSTEM

(71) Applicant: Honda Motor Co., Ltd., Tokyo (JP)

(72) Inventors: Kohei Kakuta, Saitama (JP); Yuji Terasawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 732 days.

(21) Appl. No.: 17/973,473

(22) Filed: Oct. 25, 2022

(65) Prior Publication Data

US 2023/0187678 A1 Jun. 15, 2023

(30) Foreign Application Priority Data

Dec. 9, 2021 (CN) .......................... 202123082583.1

(51) Int. Cl.
H01M 8/2484 (2016.01)
H01M 8/04007 (2016.01)
H01M 8/04082 (2016.01)
H01M 8/2475 (2016.01)
(52) U.S. Cl.
CPC ..... H01M 8/2484 (2016.02); H01M 8/04201 (2013.01); H01M 8/2475 (2013.01); H01M 8/04074 (2013.01); H01M 2250/20 (2013.01)
(58) Field of Classification Search
CPC .......... H01M 8/2484; H01M 8/04201; H01M 8/2475; H01M 8/04074; H01M 2250/20
See application file for complete search history.

(56) References Cited

U.S. PATENT DOCUMENTS

| | | | | |
|---|---|---|---|---|
| 2009/0110990 A1* | 4/2009 | Izutani | .............. | H01M 8/04201 |
| | | | | 429/425 |
| 2010/0003559 A1* | 1/2010 | Hirakata | ............... | F17C 11/005 |
| | | | | 429/433 |
| 2010/0062319 A1* | 3/2010 | Katano | ............. | H01M 8/04097 |
| | | | | 429/411 |
| 2021/0104756 A1* | 4/2021 | Yoshitomi | ........... | H01M 8/2484 |

FOREIGN PATENT DOCUMENTS

| | | | |
|---|---|---|---|
| JP | 2004253258 A | * | 9/2004 |
| JP | 2021061122 | | 4/2021 |

OTHER PUBLICATIONS

Machine Translation of JP-2004253258-A (May 13, 2025) (Year: 2025).*

* cited by examiner

*Primary Examiner* — Matthew J Merkling
(74) *Attorney, Agent, or Firm* — JCIPRNET

(57) ABSTRACT

A fuel cell system includes a fuel cell stack; a fuel gas supply pipe supplying a fuel gas to the fuel cell stack; an injector injecting the fuel gas supplied from the fuel gas supply pipe into the fuel cell stack through a piping unit; and a buffer part located at an upstream side of the injector and being capable of circulating the fuel gas. The buffer part includes: a manifold; and a buffer tank connected to the manifold and circulating the fuel gas, and the manifold is disposed between the fuel gas supply pipe and the piping unit.

4 Claims, 9 Drawing Sheets

FUEL CELL SYSTEM

CROSS-REFERENCE TO RELATED APPLICATION

This application claims the priority benefit of Chinese application no. 202123082583.1, filed on Dec. 9, 2021. The entirety of the above-mentioned patent application is hereby incorporated by reference herein and made a part of this specification.

BACKGROUND

Technical Field

The disclosure relates to a fuel cell system.

Description of Related Art

Generally speaking, a fuel cell vehicle includes a fuel cell stack, a hydrogen supply pipe, and an injector. The hydrogen supply pipe supplies hydrogen as a fuel gas to the fuel cell stack, and the injector is disposed at a midway position of the hydrogen supply pipe and injects hydrogen to the fuel cell stack. In such a fuel cell vehicle, pressure pulsation is generated in hydrogen at a position closer to the upstream than the injector along with the operation of the injector, and the hydrogen supply pipe vibrates due to the pressure pulsation of hydrogen, accordingly generating noise in a vehicle cabin.

To reduce such noise, for example, Patent Document 1 (Japanese Patent Application Laid-Open No. 2021-61122) discloses a fuel cell vehicle in which a buffer tank is disposed at an upstream of an injector connected to a hydrogen supply pipe. Such a buffer tank suppresses sudden reduction in the hydrogen pressure caused by the operation of the injector, accordingly suppressing noise in the vehicle cabin. However, in Patent Document 1, a branch pipe connected to the buffer tank is disposed on a piping unit. Therefore, both a main flow passage and a branch flow passage supplying hydrogen from the hydrogen supply pipe to the injector are required to be constructed in the piping unit, and therefore, a space available for forming the branch flow passage is required.

SUMMARY

An embodiment of the disclosure provides a fuel cell system. The fuel cell system includes: a fuel cell stack; a fuel gas supply pipe supplying a fuel gas to the fuel cell stack; an injector injecting the fuel gas supplied from the fuel gas supply pipe into the fuel cell stack through a piping unit; and a buffer part located at an upstream side of the injector and being capable of circulating the fuel gas. The buffer part includes: a manifold; and a buffer tank connected to the manifold and circulating the fuel gas, and the manifold is disposed between the fuel gas supply pipe and the piping unit.

DESCRIPTION OF THE EMBODIMENTS

Figure 1:
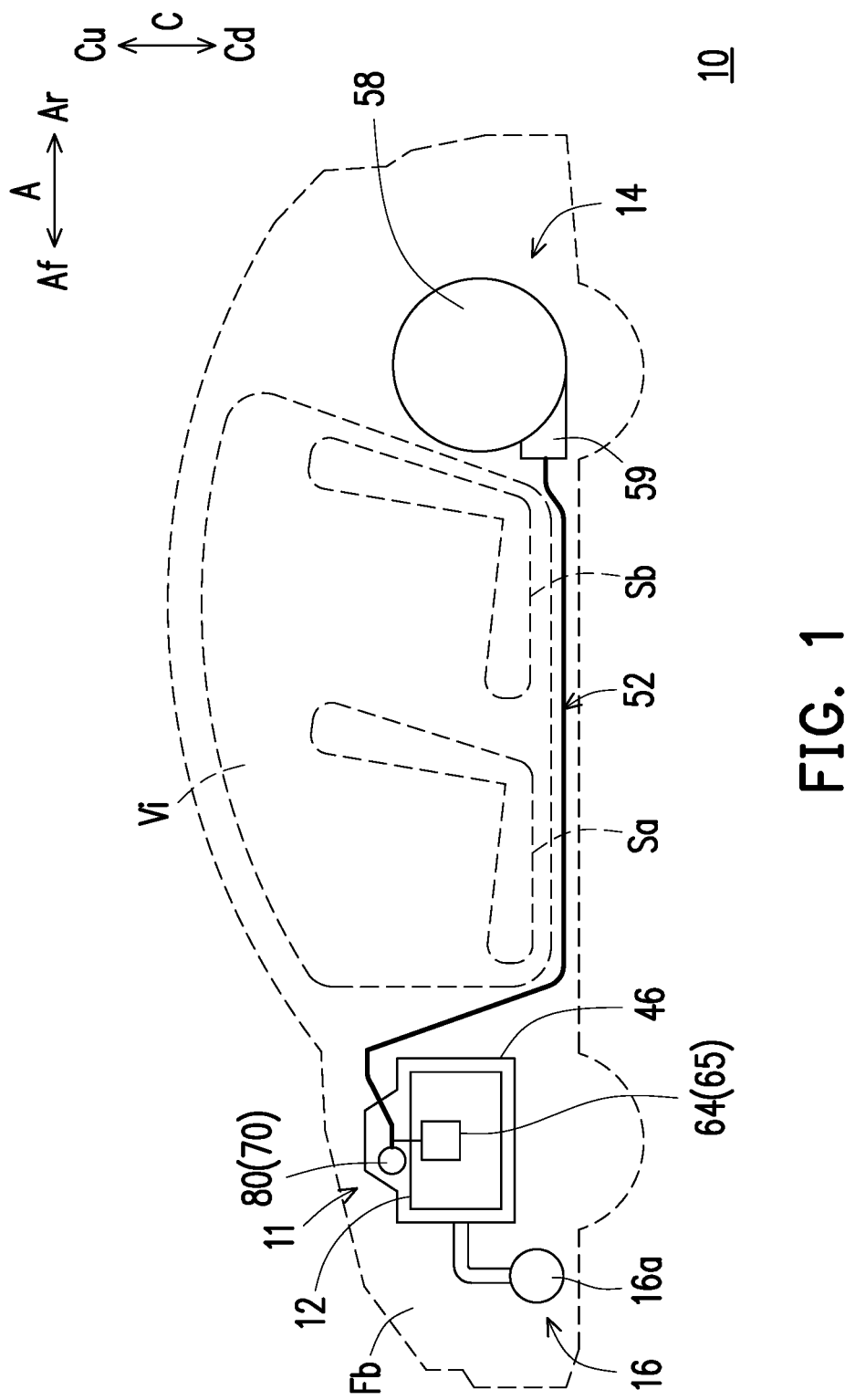
FIG. 1 is a side view schematically showing a fuel cell system mounted on a fuel cell vehicle according to an embodiment of the disclosure.

A fuel cell system of embodiments of the disclosure exhibits improved layout flexibility.

An embodiment of the disclosure provides a fuel cell system. The fuel cell system includes: a fuel cell stack; a fuel gas supply pipe supplying a fuel gas to the fuel cell stack; an injector injecting the fuel gas supplied from the fuel gas supply pipe into the fuel cell stack through a piping unit; and a buffer part located at an upstream side of the injector and being capable of circulating the fuel gas. The buffer part includes: a manifold; and a buffer tank connected to the manifold and circulating the fuel gas, and the manifold is disposed between the fuel gas supply pipe and the piping unit.

In an embodiment of the disclosure, the fuel gas supply pipe, a portion of the manifold, and the piping unit are formed as a main flow passage for supplying the fuel gas to the injector, and another portion of the manifold branches off from the main flow passage to form a branch flow passage and is connected to the buffer tank. The manifold includes a flow passage direction switching unit switching a flow passage direction of the fuel gas in the main flow passage from a flow passage direction of the fuel gas supply pipe to a flow passage direction of the piping unit.

In an embodiment of the disclosure, the another portion of the manifold is a sub-pipe branching off relative to the main flow passage and being connected to the buffer tank, and the sub-pipe is disposed inclined toward the piping unit relative to the main flow passage.

In an embodiment of the disclosure, the buffer tank includes a first housing and a second housing, the first housing and the second housing are fastened to form an enclosed space, and the flow passage direction switching unit and the sub-pipe are disposed on one of the first housing and the second housing.

In an embodiment of the disclosure, the fuel gas supply pipe is fixed on the flow passage direction switching unit.

In an embodiment of the disclosure, the buffer tank is horizontally arranged in parallel with the fuel gas supply pipe or the piping unit.

Based on the foregoing, in the fuel cell system of embodiments of the disclosure, through forming a portion of the buffer part as a portion of the main flow passage and disposing the branch flow passage in the buffer part, the fuel cell system can exhibit improved layout flexibility. Furthermore, through disposing the structure of a portion of the main flow passage in the buffer part, the structure of the upstream pipeline parts can be simplified, and an integrally forged one-piece structure can be formed accordingly, suppressing offsets between both ends thereof and costs of parts. Moreover, compared with mounting the sub-pipe perpendicular to the main flow passage, through disposing the sub-pipe inclined toward the piping unit relative to the main flow passage, the buffer part can be designed more compactly and exhibit further improved layout flexibility. Also, through disposing the flow passage direction switching unit, disposing the pipes of the fuel gas supply pipe and the piping unit can be simplified, and the flow passage direction of the fuel gas can be appropriately switched depending on the requirements, so that layout flexibility in the auxiliary equipment housing can be improved. In addition, through fixing the fuel gas supply pipe on the flow passage direction switching unit, the members can be disposed compactly and layout flexibility can be improved. Besides, through horizontally arranging the buffer tank in parallel with the fuel gas supply pipe or the piping unit, the volume of the fuel cell system in the height direction can also be suppressed, exhibiting maximally improved layout flexibility.

To make the aforementioned more comprehensible, several embodiments accompanied with drawings are described in detail as follows.

Figure 2:
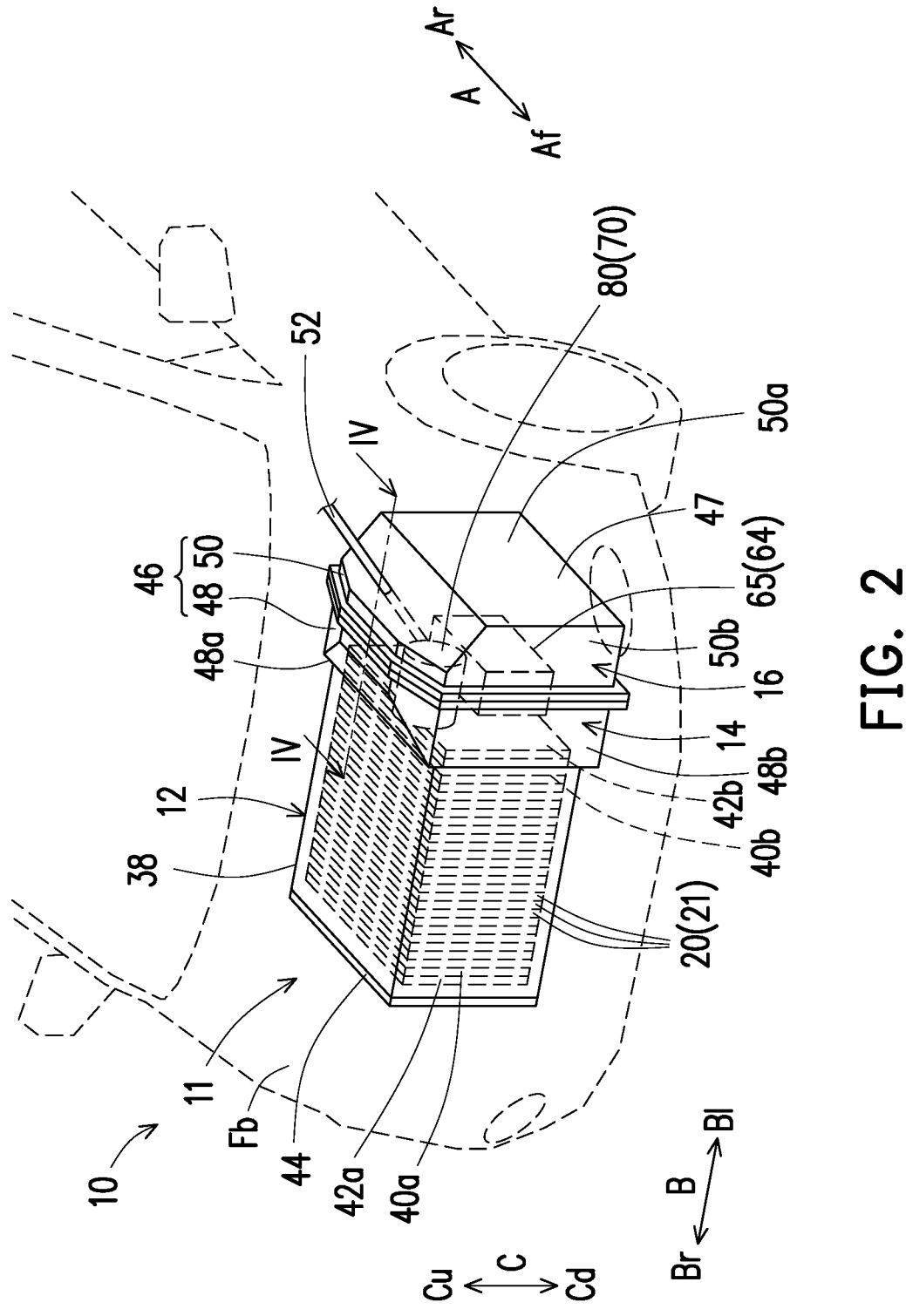
FIG. 2 is a partial perspective view schematically showing a configuration state of the fuel cell system accommodated in a front case of the fuel cell vehicle of FIG. 1.
Figure 3:
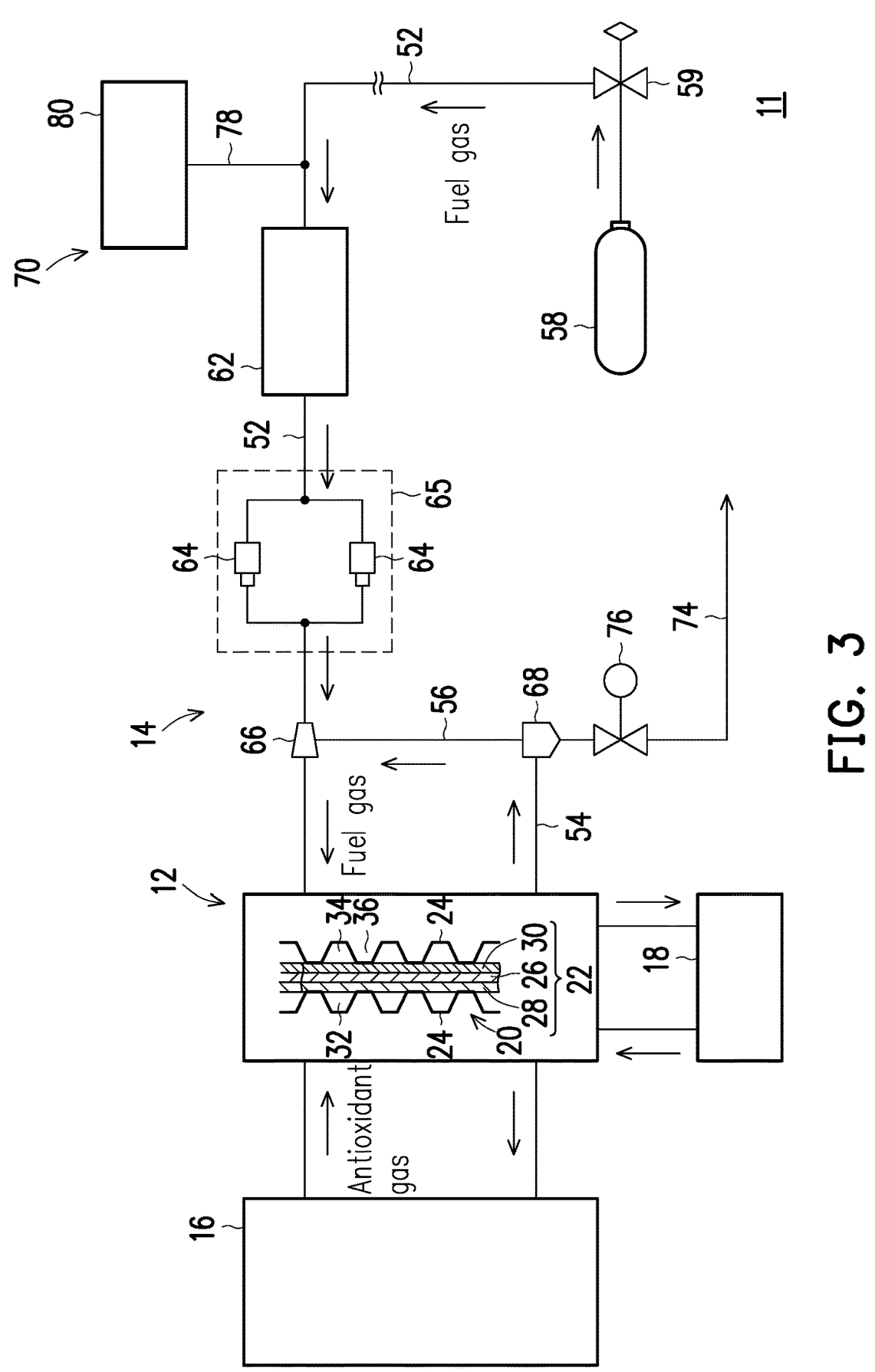
FIG. 3 is a block diagram showing the structure of the fuel cell system.
Figure 4:
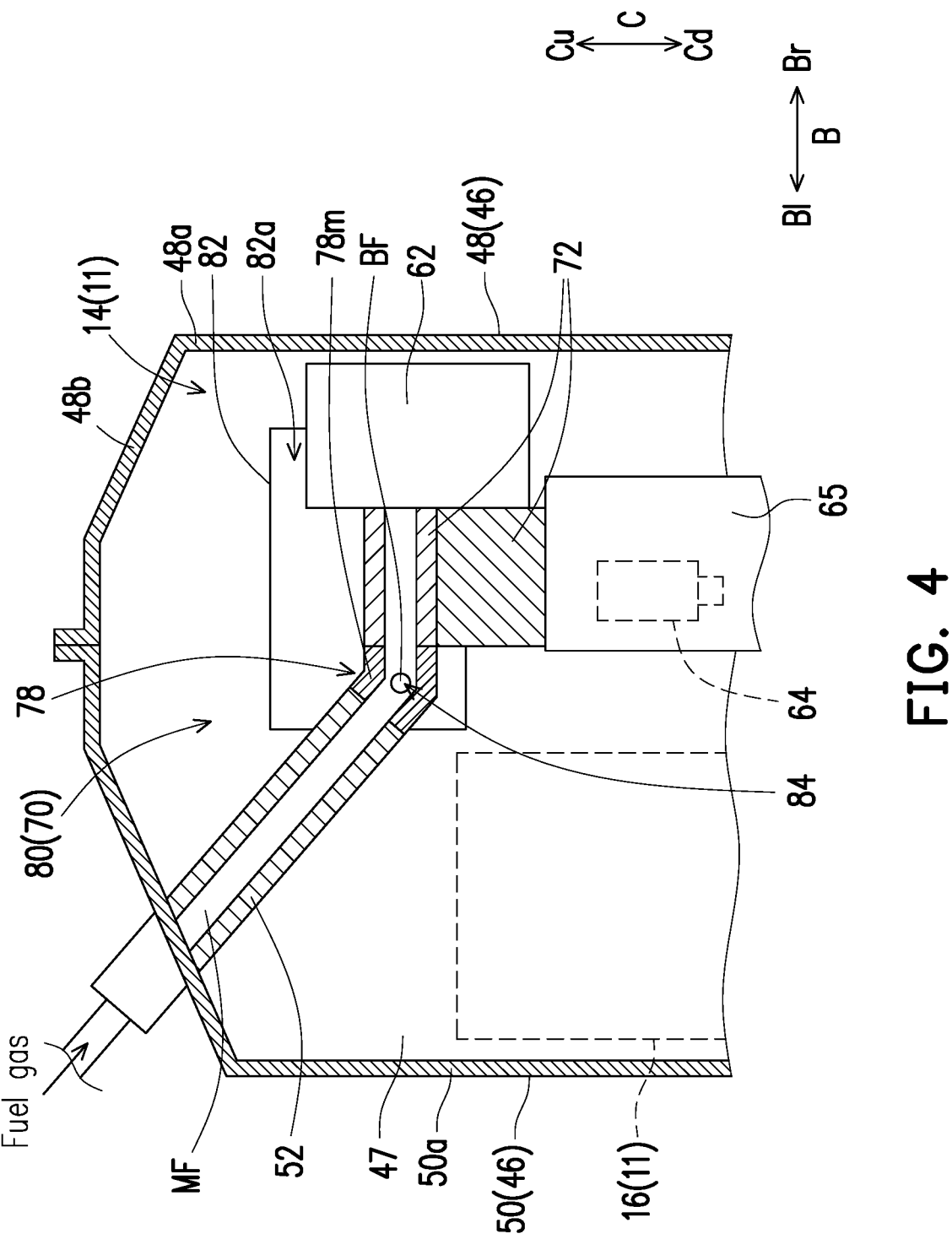
FIG. 4 is a cross-sectional view of the fuel cell system of FIG. 2 along line IV-IV.
Figures 5A, 5B:
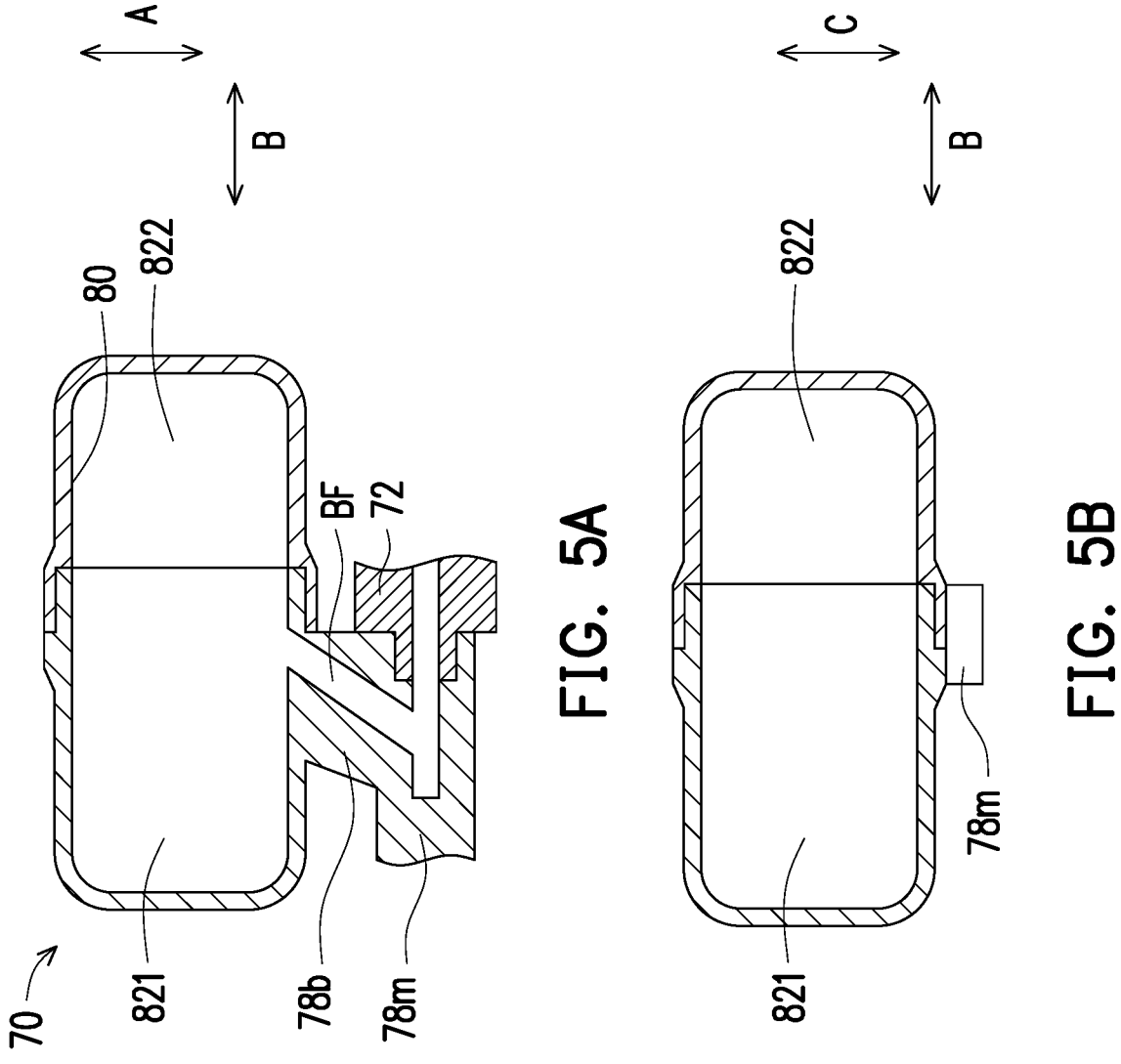
FIG. 5A is a top view of a buffer part of FIG. 2.
FIG. 5B and FIG. 5C are schematic views of the buffer part of FIG. 2 viewed from different viewing angles.
Figures 5C, 5D:
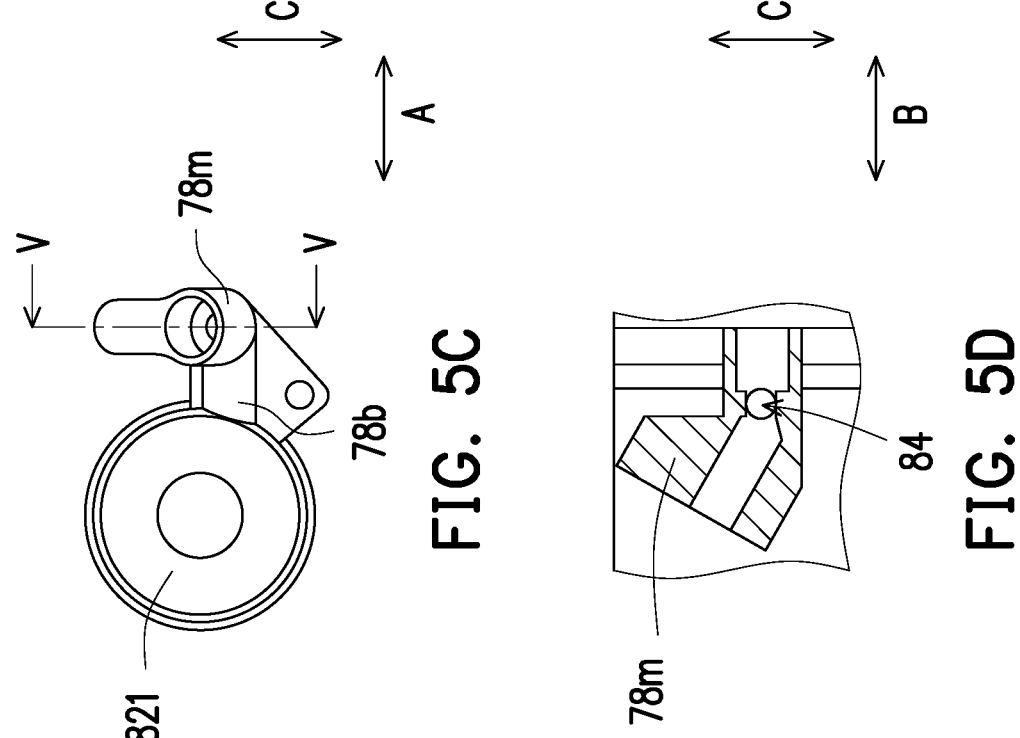
FIG. 5D is a cross-sectional view of a flow passage direction switching unit of FIG. 2 along line V-V.
Figures 5E, 5F:
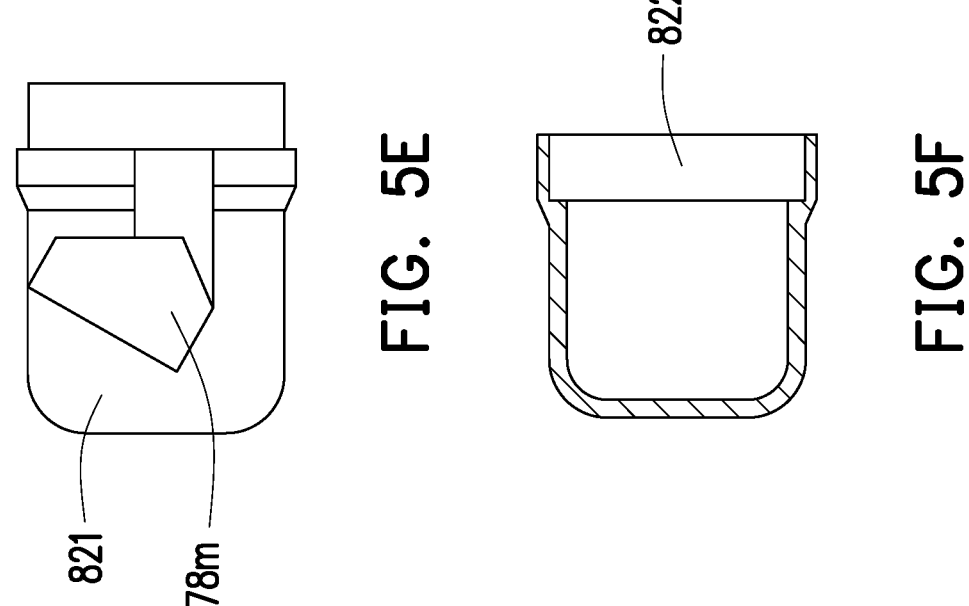
FIG. 5E and FIG. 5F are schematic views of separate first housing and second housing of a buffer tank of FIG. 5A.
Figure 6:
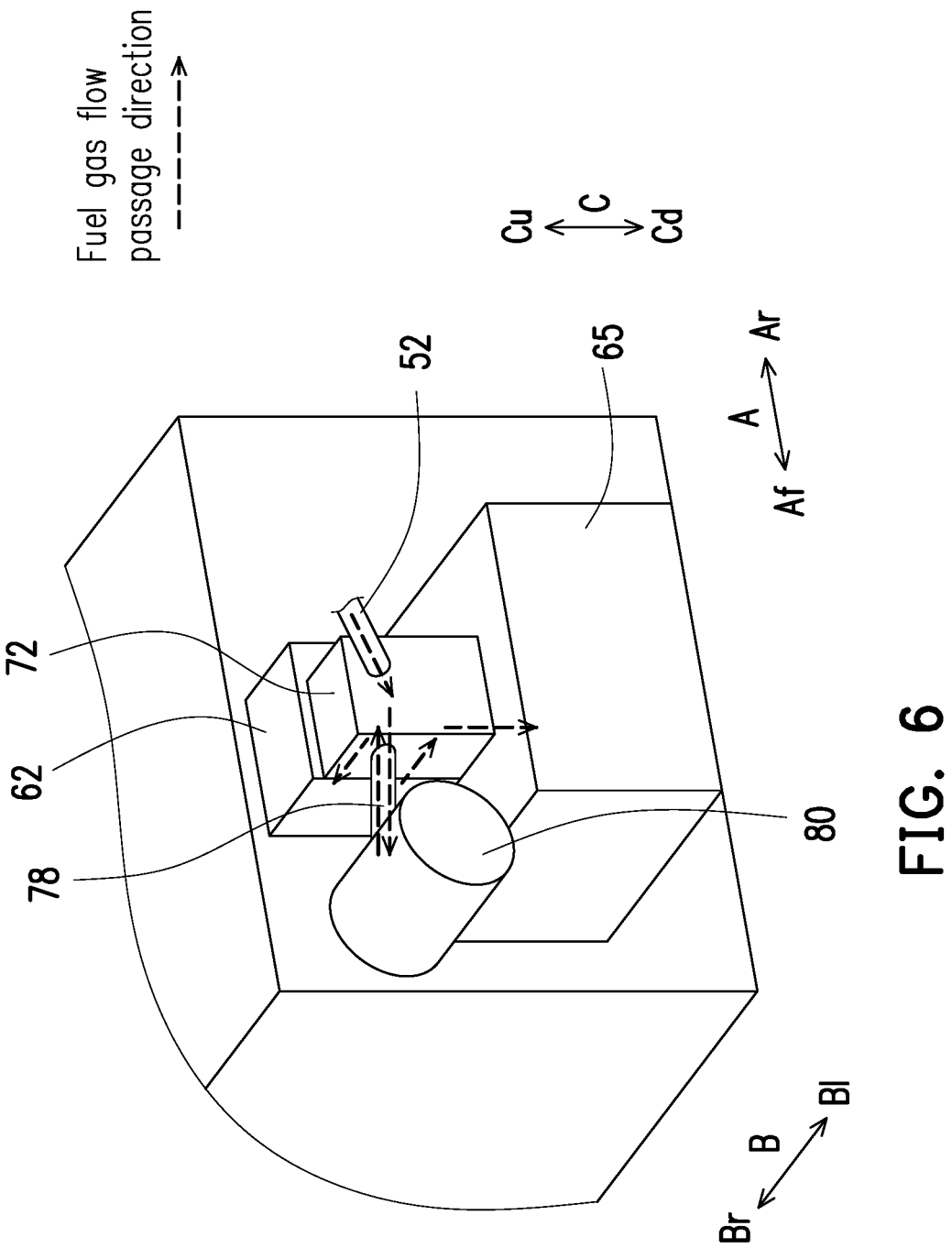
FIG. 6 schematically shows a relative configuration view of a buffer tank with a fuel gas supply pipe and a piping unit of FIG. 2.

FIG. 1 is a side view schematically showing a fuel cell system mounted on a fuel cell vehicle according to an embodiment of the disclosure. FIG. 2 is a partial perspective view schematically showing a configuration state of the fuel cell system accommodated in a front case of the fuel cell vehicle of FIG. 1. FIG. 3 is a block diagram showing the structure of the fuel cell system. FIG. 4 is a cross-sectional view of the fuel cell system of FIG. 2 along line IV-IV. FIG. 5A is a top view of a buffer part of FIG. 2. FIG. 5B and FIG. 5C are schematic views of the buffer part of FIG. 2 viewed from different viewing angles. FIG. 5D is a cross-sectional view of a flow passage direction switching unit of FIG. 2 along line V-V. FIG. 5E and FIG. 5F are schematic views of separate first housing and second housing of a buffer tank of FIG. 5A. FIG. 6 schematically shows a relative configuration view of a buffer tank with a fuel gas supply pipe and a piping unit of FIG. 2.

As shown in FIG. 1 and FIG. 3, a fuel cell vehicle 10 according to an embodiment of the disclosure includes a fuel cell system 11 that generates electricity for traveling. The fuel cell system 11 includes: a fuel cell stack 12; an anode system apparatus 14 that supplies fuel a gas (or referred to as an anode gas) to the fuel cell stack 12; a cathode system apparatus 16 that supplies an antioxidant gas (or referred to as a cathode gas) to the fuel cell stack 12; and a cooling apparatus 18 that circulates a refrigerant relative to the fuel cell stack 12. For example, in this embodiment, the fuel gas may be hydrogen, and the antioxidant gas may be air.

As shown in FIG. 1 and FIG. 3, a front case Fb (a motor room) accommodating a motor (not shown) that utilizes the electricity supply of the fuel cell system 11 to rotate and drive is disposed at a front side (a side of arrow sign Af) in a vehicle length direction of the fuel cell vehicle 10. Auxiliary equipment of the fuel cell system 11 (the fuel cell stack 12, the anode system apparatus 14, the cathode system apparatus 16, and the cooling apparatus 18) is accommodated in the front case Fb. Moreover, FIG. 1 representatively shows an injector 64 and a buffer part 70 to be described later as the auxiliary equipment of the anode system apparatus 14, and representatively shows a compressor 16a as the auxiliary equipment of the cathode system apparatus 16.

In addition, a vehicle cabin Vi for seating a user of the fuel cell vehicle 10 is formed at a rear side (a side of arrow sign Ar) of the front case Fb, and a front seat Sa and a rear seat Sb are disposed in the vehicle cabin Vi. Furthermore, a fuel gas tank 58 which is the auxiliary equipment of the anode system apparatus 14 is mounted at the rear side (the side of arrow sign Ar) of the rear seat Sb of the fuel cell vehicle 10. Moreover, the anode system apparatus 14 includes a fuel gas supply pipe 52 for supplying a fuel gas from the fuel gas tank 58 to the fuel cell stack 12. The fuel gas supply pipe 52 extends within the bottom plate of the fuel cell vehicle 10 (the bottom of the vehicle body frame) along the vehicle length direction (a direction of arrow sign A), connecting the auxiliary equipment of the anode system apparatus 14 in the front case Fb and the fuel gas tank 58. Alternatively, the fuel gas tank 58 may also be disposed below the rear seat Sb. In this embodiment, for example, a rigid metal pipe is used for the fuel gas supply pipe 52.

As shown in FIG. 2, the fuel cell stack 12 of the fuel cell system 11 includes a plurality of electricity generating cells 20 generating electricity through an electrochemical reaction of the fuel gas and the antioxidant gas. In a state where the fuel cell stack 12 is mounted on the fuel cell vehicle 10, the plurality of electricity generating cells 20 are formed as a laminate 21 formed by lamination along a vehicle width direction (a direction of arrow sign B) with the electrode surface in an upright position. Alternatively, the plurality of electricity generating cells 20 may also be laminated in the vehicle length direction or in a gravity direction (a direction orthogonal to the upright position of the fuel cell vehicle 10: a direction of arrow sign C) of the fuel cell vehicle 10.

As shown in FIG. 3, the electricity generating cell 20 is formed of an electrolyte membrane-electrode structure 22 and two separators 24 sandwiching the electrolyte membrane-electrode structure 22. The electrolyte membrane-electrode structure 22 includes an electrolyte membrane 26 (e.g., a solid polymer electrolyte membrane (cation exchange membrane)), an anode 28 disposed at one side of the electrolyte membrane 26, and a cathode 30 disposed at the other side of the electrolyte membrane 26. An anode gas flow passage 32 (FIG. 3?) circulating the fuel gas and a cathode gas flow passage 34 circulating the antioxidant gas are respectively formed on the surfaces of the two separators 24 facing the electrolyte membrane-electrode structure 22. In addition, due to the lamination of the plurality of electricity generating cells 20, a refrigerant flow passage 36 circulating the refrigerant is formed on the surfaces of the two separators 24 facing each other.

Also, the fuel cell stack 12 includes: a plurality of non-shown communication holes (anode gas communication holes, cathode gas communication holes, and refrigerant communication holes) respectively circulating the fuel gas, the antioxidant gas, and the refrigerant along the lamination direction of the plurality of electricity generating cells 20. In the laminate 21, the anode gas communication holes are in communication with the anode gas flow passage 32, the cathode gas communication hole are in communication with the cathode gas flow passage 34, and the refrigerant communication hole are in communication with the refrigerant flow passage 36.

The fuel cell stack 12 is supplied with the fuel gas by the anode system apparatus 14. In the fuel cell stack 12, the fuel gas is circulated through the anode gas communication hole (an anode gas inlet communication hole) and flows into the anode gas flow passage 32, and serves for electricity generation in the anode 28. The fuel gas (including an unreacted fuel gas) used during electricity generation flows out from the anode gas flow passage 32 to the anode gas communication hole (an anode gas outlet communication hole) and is discharged to the anode system apparatus 14 outside the fuel cell stack 12.

In addition, the fuel cell stack 12 is supplied with the antioxidant gas by the cathode system apparatus 16. In the fuel cell stack 12, the antioxidant gas is circulated through the cathode gas communication hole (a cathode gas inlet communication hole) and flows into the cathode gas flow passage 34, and serves for electricity generation in the cathode 30. The antioxidant gas used during electricity generation flows out from the cathode gas flow passage 34 to the cathode gas communication hole (a cathode gas outlet communication hole) and is discharged to the cathode system apparatus 16 outside the fuel cell stack 12.

Also, the fuel cell stack 12 is supplied with the refrigerant by the cooling apparatus 18. In the fuel cell stack 12, the refrigerant is circulated through the refrigerant communication hole (a refrigerant inlet communication hole) and flows into the refrigerant flow passage 36, cooling the electricity generating cells 20. The refrigerant that has cooled the electricity generating cells 20 flows out from the refrigerant flow passage 36 to the refrigerant communication hole (a refrigerant outlet communication hole) and is discharged to the cooling apparatus 18 outside the fuel cell stack 12.

Furthermore, as shown in FIG. 2, in the fuel cell stack 12, the laminate 21 is accommodated in a stack housing 38 in the shape of a square cylinder. A wiring plate 40a and an insulating plate 42a are disposed outward at one side (a side of arrow sign Br) of the laminate 21 in the direction of arrow sign B, and are accommodated in the stack housing 38. An end plate 44 closing the space of the stack housing 38 is mounted at the side of arrow sign Br of the stack housing 38. The end plate 44 applies a fastening load in the lamination direction of the electricity generating cells 20.

A wiring plate 40b and an insulating plate 42b are disposed outward at the other side (a side of arrow sign Be of the laminate 21 in the direction of arrow sign B, and are accommodated in the stack housing 38. Furthermore, an auxiliary equipment housing 46 closing the accommodating space of the stack housing 38 is mounted at the side of arrow sign Bl of the stack housing 38.

The auxiliary equipment housing 46 is a housing having an accommodating space 47 inside, and protects the auxiliary equipment of the fuel cell system 11 and some of pipes accommodated in the accommodating space 47. The auxiliary equipment housing 46 includes a concave first housing member 48 engaged with the stack housing 38 and a concave second housing member 50 engaged with the first housing member 48.

The first housing member 48 includes: a mounting wall part 48a that is engaged with the stack housing 38 by a bolt; and a peripheral wall 48b that is connected to the outer edge of the mounting wall part 48a and protrudes in a direction of arrow sign Bl (see also FIG. 4). The mounting wall part 48a functions as an end plate applying a fastening load to the laminate 21 of the electricity generating cell 20 in the lamination direction. A plurality of holes (not shown) respectively in communication with the anode gas communication holes, the cathode gas communication holes, and the refrigerant communication holes of the electricity generating cells 20 are provided in the mounting wall part 48a, and pipes (not shown) circulating the fuel gas, the antioxidant gas, and the refrigerant are respectively connected to the holes.

The second housing member 50 includes: a side wall 50a that is located at the side of arrow sign Bl; and a peripheral wall 50b that is connected to the outer edge of the side wall

50a and protrudes in a direction of arrow sign Br (see also FIG. 4). The first housing member 48 and the second housing member 50 are assembled by engaging protruding edges disposed on the protruding ends of the respective peripheral walls 48b and 50b with each other.

In addition, the auxiliary equipment of the anode system apparatus 14 and the auxiliary equipment of the cathode system apparatus 16 are disposed in the accommodating space 47 of the auxiliary equipment housing 46. In the auxiliary equipment housing 46, the auxiliary equipment of the anode system apparatus 14 is disposed at a position adjacent to the mounting wall part 48a (the side of arrow sign Br), and the auxiliary equipment of the cathode system apparatus 16 is disposed at a position adjacent to the anode system apparatus 14 (the side of arrow sign Be (see also FIG. 4).

As shown in FIG. 3, the anode system apparatus 14 includes: the fuel gas supply pipe 52 that supplies the fuel gas to the fuel cell stack 12; and a fuel gas discharge pipe 54 that discharges the fuel gas used by the fuel cell stack 12 during electricity generation. In addition, a cycle bypass pipe 56 is connected between the fuel gas supply pipe 52 and the fuel gas discharge pipe 54, and the cycle bypass pipe 56 is for returning an unreacted fuel gas contained in the fuel gas of the fuel gas discharge pipe 54 to the fuel gas supply pipe 52.

As the auxiliary equipment of the anode system apparatus 14, the fuel gas tank 58, a heat exchanger 62, a plurality of injectors 64, an ejector 66, and a gas-liquid separator 68 may be exemplarily listed. In addition, the anode system apparatus 14 according to this embodiment includes the buffer part 70 in the fuel gas supply pipe 52 closer to an upstream side than the injectors 64.

The fuel gas tank 58 is connected to one end of the fuel gas supply pipe 52, and supplies the stored high-pressure fuel gas to the fuel gas supply pipe 52. A regulator 59 reducing the pressure of the fuel gas that flows to the fuel gas supply pipe 52 is disposed at a position near the outlet of the fuel gas tank 58.

The heat exchanger 62 heats the fuel gas supplied from the fuel gas tank 58. As a heat medium for heat exchange with the fuel gas in the heat exchanger 62, for example, the refrigerant (e.g., a mixed liquid of pure water and ethylene glycol) circulated in the fuel cell stack 12 may be used.

The plurality of (the figure exemplarily showing two) injectors 64 form one injector unit 65, injecting the fuel gas supplied at a predetermined flow rate by the fuel gas supply pipe 52 from the upstream side to the downstream side at a predetermined injection pressure. The fuel gas supply pipe 52 branches and merges according to the plurality of injectors 64. A piping unit 72 is disposed at the upstream side of the injector unit 65 (see FIG. 4). Moreover, the anode system apparatus 14 may have a structure including one injector 64, or may have a structure including three or more injectors 64.

By utilizing the negative pressure generated by the movement of the fuel gas injected from the injector unit 65, the ejector 66 suctions the fuel gas from the cycle bypass pipe 56, and supplies the fuel gas to the fuel cell stack 12 at the downstream side.

The gas-liquid separator 68 is disposed between the fuel gas discharge pipe 54 and the cycle bypass pipe 56, separating the liquid water (the water generated during electricity generation) contained in the fuel gas discharged from the fuel cell stack 12 and the fuel gas. A discharge pipe 74 discharging the separated water and reacted gases (hydrogen and nitrogen) is connected with the gas-liquid separator 68.

A valve 76 (exhaust valve) switched on or off at an appropriate timing is disposed in the discharge pipe 74.

Moreover, at a midway position of the cycle bypass pipe 56 and the like, the anode system apparatus 14 may include a pump circulating the fuel gas in the fuel gas supply pipe 52, and may also include a valve (a one-way valve) for circulating the fuel gas in one direction.

In the anode system apparatus 14 configured as described above, with the plurality of injectors 64 (the injector unit 65) serving as a boundary, the pressure of the fuel gas circulated inside is changed. In other words, the fuel gas circulated in the fuel gas supply pipe 52 at the upstream side from the regulator 59 to the injectors 64 is at a relatively high pressure (which is lower than that of the fuel gas in the fuel gas tank 58, and therefore referred to as a medium pressure below). On the other hand, the fuel gas circulated in the fuel gas supply pipe 52 closer to the downstream side than the injectors 64, the fuel gas discharge pipe 54, and the cycle bypass pipe 56 is at a pressure lower than the pressure of the fuel gas in the fuel gas supply pipe 52 at the upstream side.

As shown in FIG. 1, the fuel gas at a medium pressure is circulated in the fuel gas supply pipe 52 at the upstream side extending lengthwise along the direction of arrow sign A of the fuel cell vehicle 10 outside the auxiliary equipment housing 46. The vibration of the pulsation of the fuel gas (the injection of the fuel gas and the storage of the fuel gas) caused by the operation of the injectors 64 is transmitted to the fuel gas in the fuel gas supply pipe 52 at the upstream side. Therefore, in a case where the fuel cell vehicle 10 does not include the buffer part 70, the pressure pulsation of the fuel gas is transmitted to the fuel gas supply pipe 52 at the upstream side and excites vibration, accordingly generating noise from the bottom plate as a whole in the vehicle length direction.

As shown in FIG. 3 and FIG. 4, the buffer part 70 of the fuel cell system 11 is disposed between the fuel gas supply pipe 52 at the upstream side of the injectors 64 and the piping unit 72, is accommodated inside the auxiliary equipment housing 46, and accordingly has a function of suppressing noise formed by the operation of the injectors 64 through the fuel gas.

Specifically, the buffer part 70 includes a manifold 78 and a buffer tank 80. The buffer tank 80 is connected to the manifold 78 and circulates the fuel gas, and the manifold 78 is disposed between the fuel gas supply pipe 52 and the piping unit 72. Further, within the auxiliary equipment housing 46, in this embodiment, the fuel gas supply pipe 52 at the upstream side, a portion of the manifold 78, and the piping unit 72 are formed as a main flow passage MF for supplying the fuel gas to the injector 64. Another portion of the manifold 78 branches off from the main flow passage MF to form a branch flow passage BF, and is connected to the buffer tank 80. More specifically, as shown in FIG. 4 to FIG. 5F, the another portion of the manifold 78 is a sub-pipe 78b branching off relative to the main flow passage MF and being connected to the buffer tank 80, and the sub-pipe 78b is disposed inclined toward the piping unit 72 relative to the main flow passage MF. In other words, in the side branch structure formed by the buffer part 70, a portion thereof is formed as a portion of the main flow passage MF, and another portion thereof is formed as the branch flow passage BF connected to the buffer tank 80. Accordingly, part of the pipelines at an upstream side of the main flow passage MF and the branch flow passage BF may be disposed in the buffer part 70.

As such, compared with the structure where the buffer part 70 provided with the manifold 78 is disposed on the piping unit 72, in this embodiment, since the manifold 78 disposed in the buffer part 70 is located between the piping unit 72 and the fuel gas supply pipe 52, layout flexibility can be improved. Further, through forming a portion of the buffer part 70 as a portion of the main flow passage MF and disposing the branch flow passage BF in the buffer part 70, the fuel cell system 11 can exhibit improved layout flexibility. Furthermore, through disposing the structure of a portion of the main flow passage MF in the buffer part 70, the structure of the upstream pipeline parts can be simplified, and an integrally forged one-piece structure can be formed accordingly, suppressing offsets between both ends and costs of parts. Moreover, compared with mounting the sub-pipe 78b perpendicular to the main flow passage MF, through disposing the sub-pipe 78b inclined toward the piping unit 72 relative to the main flow passage MF, the buffer part 70 can be designed more compactly and exhibit further improved layout flexibility.

On the other hand, as shown in FIG. 4 to FIG. 5D, the manifold 78 includes a flow passage direction switching unit 78m. The fuel gas supply pipe 52 is fixed on one end of the flow passage direction switching unit 78m, and the other end of the flow passage direction switching unit 78m is connected to the piping unit 72. Moreover, the flow passage direction switching unit 78m switches a flow passage direction of the fuel gas in the main flow passage MF from a flow passage direction of the fuel gas supply pipe 52 in the main flow passage MF to a flow passage direction of the piping unit 72 in the main flow passage MF. As such, through disposing the flow passage direction switching unit 78m, disposing the pipes of the fuel gas supply pipe 52 and the piping unit 72 can be simplified, and the flow passage direction of the fuel gas can be appropriately switched depending on the requirements, so that layout flexibility in the auxiliary equipment housing 46 can be further improved. In addition, through fixing the fuel gas supply pipe 52 on the flow passage direction switching unit 78m, the members can be disposed compactly and layout flexibility can be improved.

Specifically, as shown in FIG. 4 to FIG. 5F, in this embodiment, the buffer tank 80 includes a cylindrical tank body 82 and a port 84. The tank body 82 is formed by a first housing 821 and a second housing 822. The first housing 821 and the second housing 822 are fastened to form an inner enclosed space 82a in a cylindrical shape with a predetermined volume. The tank body 82 is formed lengthwise in the vehicle width direction (the direction of arrow sign B). The port 84 is disposed on one of the first housing 821 and the second housing 822 of the tank body 82, and is disposed at the front side (the side of arrow sign Af) of the trunk portion of the tank body 82 in the vehicle length direction. The port 84 sets the branch flow passage BF and the internal space 82a to a communication state to be connected the sub-pipe 78b of the manifold 78, and the flow passage direction switching unit is connected to the buffer tank 80 through the sub-pipe 78b. A sealing member (not shown) for blocking leakage of the fuel gas is disposed between the sub-pipe 78b and the port 84. By integrally forming the tank body 82 and the port 84 into one piece, for example, the buffer tank 80 accordingly forms a structure capable of sealing the fuel gas. As such, through disposing the sub-pipe 78b, the manifold 78 can make the fuel gas flow from the main flow passage MF into the buffer tank 80, or make the fuel gas flow out from the buffer tank 80 to the main flow passage MF. Moreover, through the assembly configuration of the first housing 821 and the second housing 822, the size of the buffer tank 80 of the buffer part 70 may be easily changed or adjusted depending on the arrangement of the fuel cell and peripheral parts.

On the other hand, as shown in FIG. 4 and FIG. 6, in this embodiment, the fuel cell system 11 is connected to the upstream part of the heat exchanger 62 at the side of the piping unit 72. A sealing member (not shown) for blocking leakage of the fuel gas is disposed at the fastening portion of each member. Furthermore, the downstream part of the heat exchanger 62 is connected closer to a lower side (a side of arrow sign Cd) in the gravity direction than the piping unit 72. The piping unit 72 may split the fuel gas so as to supply the fuel gas to each injector 64. Moreover, as shown in FIG. 6, in this embodiment, the buffer tank 80 is horizontally arranged in parallel with the fuel gas supply pipe 52 or the piping unit 72. As such, the volume of the fuel cell system 11 in the height direction (i.e., the gravity direction, the direction of arrow sign C) can be suppressed, exhibiting maximally improved layout flexibility.

The fuel cell vehicle 10 according to this embodiment is substantially formed as described above, and the operation thereof will be described below.

The fuel cell vehicle 10 travels based on the electricity generated by the fuel cell system 11. As shown in FIG. 3, the fuel cell system 11 supplies and discharges the fuel gas for the fuel cell stack 12 by utilizing the anode system apparatus 14 during electricity generation, or supplies and discharges the antioxidant gas for the fuel cell stack 12 by utilizing the cathode system apparatus 16. The electricity generating cells 20 in the fuel cell stack 12 output electricity based on the fuel gas circulated in the anode gas flow passage 32 and supplied to the anode 28 and the antioxidant gas circulated in the cathode gas flow passage 34 and supplied to the cathode 30. Further, during electricity generation of the fuel cell stack 12, the fuel cell system 11 operates the cooling apparatus 18 and circulates the refrigerant to cool the fuel cell stack 12.

As shown in FIG. 1, the anode system apparatus 14 makes the fuel gas flow out from the fuel gas tank 58 to the fuel gas supply pipe 52 at the upstream side during supply of the fuel gas. The pressure of the fuel gas is reduced by the regulator 59, and the fuel gas is circulated toward the front (in a direction of arrow sign Af) of the fuel cell vehicle 10 by the fuel gas supply pipe 52 at the upstream side.

As shown in FIG. 4, within the auxiliary equipment housing 46, the fuel gas moves through the fuel gas supply pipe 52 to the buffer part 70. Moreover, part of the fuel gas flows through the sub-pipe 78b of the manifold 78 of the buffer part 70 into the buffer tank 80. At an appropriate timing (upon injection of hydrogen by the injectors 64 and the like), the fuel gas flowing into the buffer tank 80 returns to the flow passage direction switching unit 78m of the buffer part 70 for connecting the fuel gas supply pipe 52 and the piping unit 72. Also, after passing through the heat exchanger 62 connected to the piping unit 72, the fuel gas is sequentially circulated in the piping unit 72, the plurality of injectors 64, and the ejector 66 and is supplied to the fuel cell stack 12.

Here, the injectors 64 move a non-shown valve body, and repeatedly inject the fuel gas and store the fuel gas. Accompanying the operation of the injectors 64, the pressure pulsation of the fuel gas is also transmitted to the fuel gas of the fuel gas supply pipe 52 at the upstream side. The buffer part 70 is disposed in the fuel gas supply pipe 52 at the upstream side, accordingly reducing the pressure of the fuel gas and suppressing the pressure pulsation of the fuel gas closer to the upstream side than the buffer part 70. In particular, the tank body 82 is formed into a cylindrical shape, and the stress generated by the fuel gas locally generated on the inner surface forming the internal space 82a can be reduced accordingly. In addition, through dispersing the internal pressure, the setting of the wall thickness of the tank body 82 can be minimized, contributing to weight reduction of elements and improvement to space utilization. Accordingly, vibration excited at the fuel gas supply pipe 52 at the upstream side extending in the bottom plate of the fuel cell vehicle 10 can be suppressed, and noise from the fuel gas supply pipe 52 at the upstream side to the vehicle cabin Vi can be greatly reduced (see FIG. 1).

Figure 7:
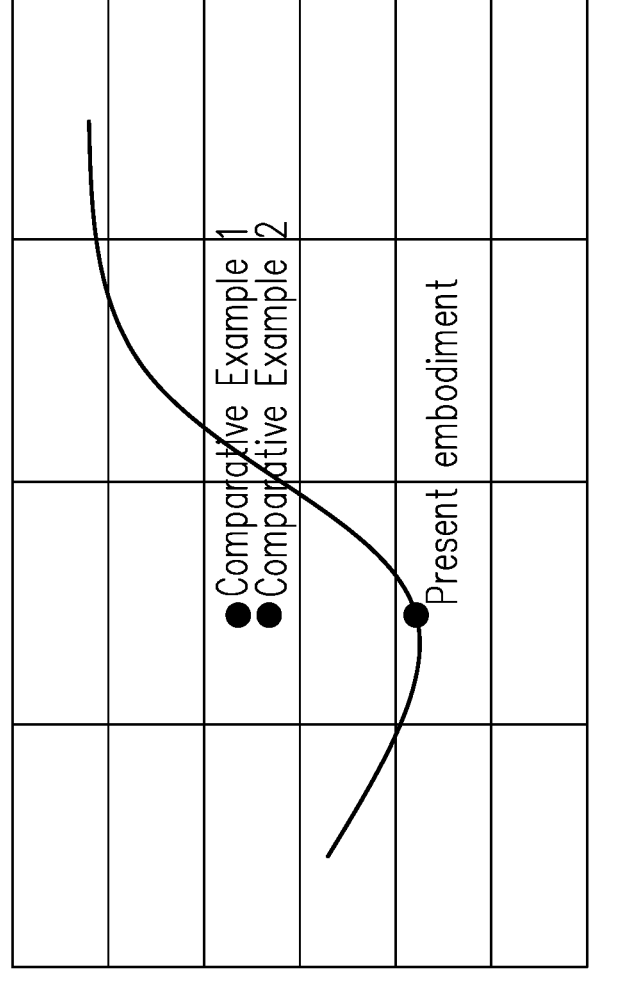
FIG. 7 is a line chart showing the relationships between a pipe diameter of a sub-pipe and a noise peak of pressure pulsation.

In addition, as shown in FIG. 7, in a case where the sub-pipe 78b has the same pipe diameter, compared with Comparative Example 1 (where the sub-pipe 78b is disposed inclined toward the fuel gas supply pipe 52 relative to the main flow passage MF) or Comparative Example 2 (where the sub-pipe 78b is mounted perpendicular to the main flow passage MF), in this embodiment, disposing the sub-pipe 78b inclined toward the piping unit 72 relative to the main flow passage MF can more effectively suppress noise generated by the fuel gas.

In addition, in this embodiment, although the fuel cell system 11 disposed in the fuel cell vehicle 10 is taken as an example, the disclosure is not limited thereto. In other embodiments, the fuel cell system 11 may also be disposed in electronic equipment that needs electricity supply. Moreover, vibration excited at gas pipes for supplying the fuel gas in the electronic equipment may also be suppressed by disposing the buffer part 70, reducing generation of noise. Moreover, provided that the fuel cell system 11 can exhibit improved layout flexibility and the structure of the upstream pipeline parts can be simplified through forming a portion of the buffer part 70 as a portion of the main flow passage MF and disposing the branch flow passage BF in the buffer part 70 in the fuel cell system 11, such arrangements all fall within the scope of the technical solutions of the embodiments of the disclosure.

In summary of the foregoing, in the fuel cell system of embodiments of the disclosure, through forming a portion of the buffer part as a portion of the main flow passage and disposing the branch flow passage in the buffer part, the fuel cell system can exhibit improved layout flexibility. Furthermore, through disposing the structure of a portion of the main flow passage in the buffer part, the structure of the upstream pipeline parts can be simplified, and an integrally forged one-piece structure can be formed accordingly, suppressing offsets between both ends thereof and costs of parts. Moreover, compared with mounting the sub-pipe perpendicular to the main flow passage, through disposing the sub-pipe inclined toward the piping unit relative to the main flow passage, the buffer part can be designed more compactly and exhibit further improved layout flexibility. Also, through disposing the flow passage direction switching unit, disposing the pipes of the fuel gas supply pipe and the piping unit can be simplified, and the flow passage direction of the fuel gas can be appropriately switched depending on the requirements, so that layout flexibility in the auxiliary equipment housing can be improved. In addition, through fixing the fuel gas supply pipe on the flow passage direction switching unit, the members can be disposed compactly and layout flexibility can be improved. Besides, through horizontally arranging the buffer tank in parallel with the fuel gas supply pipe or the piping unit, the volume of the fuel cell system in the height direction can also be suppressed, exhibiting maximally improved layout flexibility.

What is claimed is:

1. A fuel cell system comprising:

a fuel cell stack;

a fuel gas supply pipe supplying a fuel gas to the fuel cell stack;

an injector injecting the fuel gas supplied from the fuel gas supply pipe into the fuel cell stack through a piping unit; and a buffer part located at an upstream side of the injector and being capable of circulating the fuel gas, wherein the buffer part comprises:

a manifold; and a buffer tank connected to the manifold and circulating the fuel gas, wherein the manifold is disposed between the fuel gas supply pipe and the piping unit, wherein the fuel gas supply pipe, a portion of the manifold, and the piping unit are formed as a main flow passage for supplying the fuel gas to the injector, wherein another portion of the manifold branches off from the main flow passage to form a branch flow passage and is connected to the buffer tank, and wherein the manifold comprises a flow passage direction switching unit switching a flow passage direction of the fuel gas in the main flow passage from a flow passage direction of the fuel gas supply pipe to a flow passage direction of the piping unit, wherein the another portion of the manifold is a sub-pipe branching off relative to the main flow passage and being connected to the buffer tank, and the sub-pipe is disposed inclined toward the piping unit relative to the main flow passage.

2. The fuel cell system according to claim 1, wherein the buffer tank comprises a first housing and a second housing, the first housing and the second housing are fastened to form an enclosed space, and the flow passage direction switching unit and the sub-pipe are disposed on one of the first housing and the second housing.

3. The fuel cell system according to claim 1, wherein the fuel gas supply pipe is fixed on the flow passage direction switching unit.

4. The fuel cell system according to claim 1, wherein the buffer tank is horizontally arranged in parallel with the fuel gas supply pipe or the piping unit.

* * * * *